US009021552B2

(12) United States Patent
Zlatarev et al.

(10) Patent No.: US 9,021,552 B2
(45) Date of Patent: Apr. 28, 2015

(54) USER AUTHENTICATION FOR INTERMEDIATE REPRESENTATIONAL STATE TRANSFER (REST) CLIENT VIA CERTIFICATE AUTHORITY

(75) Inventors: Stephan Zlatarev, Sofia (BG); Uwe Steigmann, Daisbach (DE); Michael Engler, Walldorf (DE); Wolfgang Janzen, Mannheim (DE)

(73) Assignee: SAP SE, Walldorf (DE)

( * ) Notice: Subject to any disclaimer, the term of this patent is extended or adjusted under 35 U.S.C. 154(b) by 348 days.

(21) Appl. No.: 13/080,302

(22) Filed: Apr. 5, 2011

(65) Prior Publication Data
US 2012/0260330 A1 Oct. 11, 2012

(51) Int. Cl.
H04L 29/06 (2006.01)
G06F 21/33 (2013.01)
H04L 9/32 (2006.01)
H04L 29/08 (2006.01)

(52) U.S. Cl.
CPC .............. *G06F 21/33* (2013.01); *H04L 9/3263* (2013.01); *H04L 63/0884* (2013.01); *H04L 63/166* (2013.01); *H04L 67/142* (2013.01); *G06F 2221/2117* (2013.01); *G06F 2221/2107* (2013.01)

(58) Field of Classification Search
USPC .......................................................... 726/10
See application file for complete search history.

(56) References Cited

U.S. PATENT DOCUMENTS

| 2002/0071563 | A1* | 6/2002 | Kurn et al. ..................... 380/280 |
| 2003/0005286 | A1* | 1/2003 | McGarvey ..................... 713/155 |
| 2008/0134311 | A1* | 6/2008 | Medvinsky et al. ............... 726/7 |
| 2010/0161965 | A1* | 6/2010 | Solin et al. ..................... 713/155 |
| 2010/0211790 | A1* | 8/2010 | Zhang ............................ 713/171 |
| 2011/0041171 | A1* | 2/2011 | Burch et al. ....................... 726/7 |
| 2011/0154024 | A1* | 6/2011 | Ignaci et al. ................... 713/156 |
| 2011/0185172 | A1* | 7/2011 | Thayer et al. ................. 713/156 |
| 2012/0023568 | A1* | 1/2012 | Cha et al. ......................... 726/10 |
| 2012/0036368 | A1* | 2/2012 | Spalka .......................... 713/182 |
| 2012/0072979 | A1* | 3/2012 | Cha et al. ........................... 726/7 |

OTHER PUBLICATIONS

Kay, "QuickStudy: Representational State Transfer (REST)", Aug. 6, 2007, 2 pages.
"Representational State Transfer", from Wikipedia, the free encyclopedia, Feb. 25, 2011, 8 pages.
"caGrid 2.0 Roadmap", National Cancer Institute, Dec. 22, 2010, 6 pages.

* cited by examiner

*Primary Examiner* — Edward Zee
*Assistant Examiner* — Chi Nguy
(74) *Attorney, Agent, or Firm* — Brake Hughes Bellermann LLP

(57) ABSTRACT

The present description refers to a computer implemented method, computer program product, and computer system for receiving a resource request at a representational state transfer (REST) client from a user, the resource request including a user ID, determining, by the REST client, a key pair including a public key and a corresponding private key that are associated with the user ID, obtaining, by the REST client, a certificate associated with the user ID that is signed by a certificate authority and based on at least the user ID and the public key associated with the user ID, impersonating, by the REST client, the user to a REST server using the certificate and the private key associated with the user ID, and accessing, by the REST client on behalf of the user, using a stateless protocol with the REST server, the requested resource.

20 Claims, 3 Drawing Sheets

USER AUTHENTICATION FOR INTERMEDIATE REPRESENTATIONAL STATE TRANSFER (REST) CLIENT VIA CERTIFICATE AUTHORITY

TECHNICAL FIELD

This description is directed generally to authentication, and in particular, to a computer-implemented method, apparatus, and computer program product for user authentication for intermediate representational state transfer (REST) client via a certificate authority.

BACKGROUND

Representational state transfer (REST) is a style of software architecture for distributed media systems such as the World Wide Web. The REST architectural style governs the behavior of participants, and identifies a number of constraints. REST was initially described in the context of Hypertext Transfer Protocol (HTTP), but is not limited to HTTP. Applications that comply with the constraints or recommendations of REST are described as being RESTful. RESTful applications typically make use of existing, well defined interfaces and capabilities.

The REST architectural style describes a number of constraints to the architecture while leaving the implementation of the individual components flexible and up to the protocol designer. According to these constraints, clients and servers are typically separate or communicate via a uniform interface. For example, HTTP allows several standard methods such as Get, Post, Put, Delete, etc. In addition, REST software architecture typically involves a stateless protocol in which no client context is stored on the server between requests. State information may be stored on the server, such as resources. For example, resources stored on the server may be addressable or accessible via an identifier or URL (Uniform Resource Locator). Also, the client may store state information. A layered system or a layered architecture is typically used for REST based architectures, and in such cases, clients may not be able to determine whether it is connected directly to an end server or to an intermediary (or intermediate device or client) along the way.

HTTP is an example of a RESTful protocol. RESTful protocols, such as HTTP, may include limited features or fields for communicating security credentials. For example, hash values may be provided within HTTP headers. However, RESTful protocols, such as HTTP, do not typically allow for other, more complex security credentials (such as security tokens or certificates, etc.) to be communicated within HTTP messages or requests. Therefore, REST clients and REST servers (such as, for example, HTTP clients and servers) may be limited in their ability to communicate security credentials and perform some types of security related functions.

SUMMARY

In one general aspect, a computer program product is provided. The computer program product is tangibly embodied on a computer-readable storage medium and includes executable code that, when executed, is configured to cause at least one data processing apparatus to receive a resource request at a representational state transfer (REST) client from a user, the resource request including a user ID, determine, by the REST client, a key pair including a public key and a corresponding private key that are associated with the user ID, and obtain, by the REST client, a certificate associated with the user ID that is signed by a certificate authority and based on at least the user ID and the public key associated with the user ID. The code is further configured to cause the data processing apparatus to impersonate, by the REST client, the user to a REST server using the certificate and the private key associated with the user ID, and access, by the REST client on behalf of the user, using a stateless protocol with the REST server, the requested resource.

In another general aspect, a computer implemented method is provided that includes receiving a resource request at a representational state transfer (REST) client from a user, the resource request including a user ID, determining, by the REST client, a key pair including a public key and a corresponding private key that are associated with the user ID, obtaining, by the REST client, a certificate associated with the user ID that is signed by a certificate authority and based on at least the user ID and the public key associated with the user ID, impersonating, by the REST client, the user to a REST server using the certificate and the private key associated with the user ID, and accessing, by the REST client on behalf of the user, using a stateless protocol with the REST server, the requested resource.

In another general aspect, an apparatus includes a transceiver configured to receive a resource request at a representational state transfer (REST) client from a user, the resource request including a user ID, key determination logic configured to determine, by the REST client, a key pair including a public key and a corresponding private key that are associated with the user ID, and certificate acquisition logic configured to obtain, by the REST client, a certificate associated with the user ID that is signed by a certificate authority and based on at least the user ID and the public key associated with the user ID. The apparatus further includes impersonating logic configured to impersonate, by the REST client, the user to a REST server using the certificate and the private key associated with the user ID, and accessing logic configured to access, by the REST client on behalf of the user, using a stateless protocol with the REST server, the requested resource.

The subject matter described in this specification can be implemented as a method or as a system or using computer program products, tangibly embodied in information carriers, such as a CD-ROM, a DVD-ROM, a semiconductor memory, and a hard disk. Such computer program products may cause a data processing apparatus to conduct one or more operations described herein.

In addition, the subject matter described herein may also be implemented as a system including a processor and a memory coupled to the processor. The memory may encode one or more programs that cause the processor to perform one or more of the method acts described in this specification.

The details of one or more implementations are set forth in the accompanying drawings and the description below. Other features will be apparent from the description and drawings, and from the claims.

DETAILED DESCRIPTION

In the following, a detailed description of examples will be given with reference to the drawings. It should be understood that various modifications to the examples may be made. In particular, elements of one example may be combined and used in other examples to form new examples.

Figure 1:
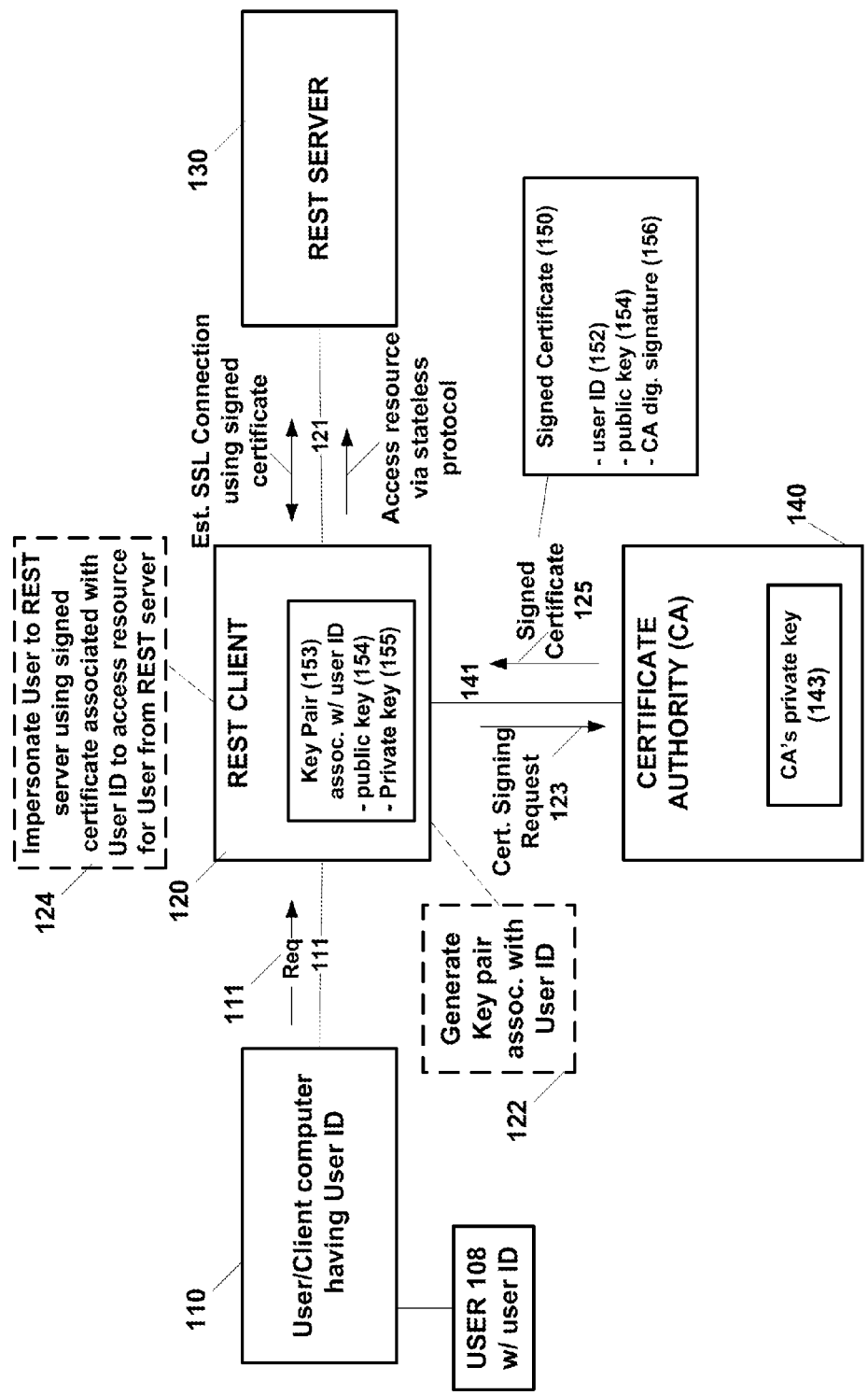
FIG. 1 is a block diagram illustrating an exemplary system where an intermediate representational state transfer (REST) client impersonates a user or client to a REST server based on security credentials obtained from a trusted certificate authority.

FIG. 1 is a block diagram illustrating an exemplary system where an intermediate (or intermediary) representational state transfer (REST) client impersonates a user (or other client) to a REST server based on security credentials obtained from a trusted certificate authority. In an example implementation shown in FIG. 1, a user 108 may have a user identifier (user ID) or other name or identifier. The user 108 may operate a user computer 110, for example. The user computer (or client computer) 110 may be coupled to a REST client 120 via a communications link 111. REST client 120 is also coupled to a certificate authority 140 via link 141, and is also coupled to a REST server 130 via link 121. REST client 120 may be considered an intermediate or intermediary REST client since REST client 120 communicates with both the user computer 110 and the REST server 130.

The user computer 110, REST client 120, certificate authority (CA) 140 and REST server 130 in FIG. 1 are shown as being connected via communication links 111, 141 and 121. However, in one example implementation each (or one or more) of these entities may be coupled together (or may communicate) via one or more networks, such as a Local Area Network, a wireless network, the Internet, and/or other network(s), not shown.

As noted, Representational state transfer (REST) is a style of software architecture for distributed media systems such as the World Wide Web. The REST architectural style governs the behavior of participants, and identifies a number of constraints. REST was initially described in the context of Hypertext Transfer Protocol (HTTP), but is not limited to HTTP. Applications that comply with the constraints or recommendations of REST may be considered to be RESTful.

In one example implementation, REST client 120 and REST server 130 may communicate via a RESTful protocol, such as HyperText Transfer Protocol (HTTP), for example, or other RESTful protocol. In one example implementation, REST server 130 may store a resource, e.g., that may be assigned to or associated with the user 108 (or associated with or assigned to the user ID for user 108), for example.

REST client 120 may, from time to time, access resources stored by REST server 130 via HTTP or other RESTful protocol. In one illustrative example, REST client 120 may be associated with (or may be used to provide) a photograph print service, and REST server 130 may store one or more photos for users as part of a web photo storage service. For example, a user 108 operating user computer 110 may be identified by a user identifier or user ID. The user 108 may have photos stored on or by REST server 130. Or, in other words, the web photo storage service may store one or more photos for the user 108 (and associated with the user ID for user 108) on the REST server 130, or in another storage location controlled by REST server 130. The example of a photo printing service and web photo storage service is merely an illustrative example and the disclosure is not limited thereto.

User 108, via user computer 110, may send a request 113 to REST client 120, such as a resource request. The resource request may be a request to access a resource or a request to obtain a copy of a resource (e.g., a request to obtain a copy of a photo stored by REST server 130), a request for REST client 120 to provide processing of a resource stored by REST server 130 (e.g., to provide a print version of a photo stored by server 130), or other resource-related request, for example.

In one illustrative example, REST client 120 may authenticate user 108, e.g., using a username (or user ID) and password provided by user 108 via user computer 110, or other authentication technique. For example, the user 108 may log in to the printing service provided by REST client 120, e.g., using a user ID and password. User 108, via computer 110, may then send a request to REST server 120 (or to the photo print service) for a 8"×10" color print of a specific photo identified by the user 108 (e.g., having a photo ID) stored by REST server 130. Thus, the user 108, may send a message to REST client 120 that includes a request for a color print of a photo, a user ID (or user identifier) of the user 108, and a photo identifier (or photo ID), which may be a link or URL to a location where the photo may be stored by server 130, for example. The photo (identified by the photo ID) may be stored by server 130 in an account associated with (or owned by or assigned to) the user ID (e.g., stored for user 108).

In an example implementation, only user 108 has permission to access photos stored in the user's account stored by server 130. In such an example implementation, REST client 120 may not have permission to access photos in the user's web photo storage account provided by REST server 130.

User computer 110 may store security credentials, such as a certificate, security token, a private key/public key pair, or other credentials, that allows the user 108 to authenticate itself to REST server 130 to allow the user 108 to access photos stored by server 130. However, in this example, the user 108 has requested the REST client 120 to access a photo from REST server 130 and then print out a copy to be sent to user 108.

However, in some cases, there may be problems that may prevent the REST client 120 from accessing the user's photo account on REST server 130 via a RESTful protocol. In one example implementation, the RESTful protocol (e.g., HTTP) does not have the ability to pass the user's security credentials (e.g., certificate, security token) from the REST client 120 to the REST server 130. In one example implementation, security credentials may be required by the REST server 130 to authenticate the user 108, before allowing the user 108 to access his/her photo account, for example. As noted, RESTful protocols do not typically have the ability to forward or communicate security credentials. Also, the RESTful protocol may be considered a stateless protocol where the REST server 130 does not store context information of the client between requests. Moreover, user 108 may not typically provide or share its own private key (that may be stored by user computer 110) with REST client 120, since sharing a private key might compromise such private key/public key pair.

Therefore, according to an example implementation, REST client 120 may use an entity that is trusted by the REST server 130 (such as certificate authority (CA) 140) to obtain security credentials to allow REST client 120 to impersonate user 108 to REST server 130. In this manner, the intermediate REST client 120 may obtain access to the user's account stored on REST server 130 through the use of the stateless protocol or RESTful protocol (e.g., such as HTTP or secure HTTP, known as HTTPS). In an example implementation, certificate authority 140 may be a Security Token Service (STS). REST client 120 may impersonate user 108 by presenting security credentials (or other information) associated with the user ID of user 108 to REST server 130 to provide the appearance to REST server 130 that REST client 120 is user 108 (and/or acting on behalf of user 108) to obtain access to information stored by REST server 130 that is typically only accessible by the user 108. Although, in this example, REST client 120 may be considered to be an authorized impersonator since REST client 120 has permission from user 108 to access the user's photos or other information stored on REST server 130.

Referring to FIG. 1 again, after receiving the request 113 from user computer 110 (e.g., which may include an identification of the resource or photo, and a user ID of the user 108), at 122, REST client 120 may generate a key pair 153 that includes a public key 154 and a corresponding private key 155 that are associated with the User ID of user 108. Or, if REST client 120 has previously generated and stored a key pair 153 for the user ID, the REST client 120 may retrieve from its memory the key pair 153 associated with the User ID for user 108. Thus, in this manner, the REST client 120 may determine a key pair associated with the User ID (either by generating the key pair, or by retrieving a previously generated key pair from memory, for example).

In one example implementation, certificate authority 140 and REST client 120 may be provided on separate (or different) computers or systems coupled together via the Internet or other network. In another example implementation, the REST client 120 and the certificate authority 140 may be different software programs running on a single computer or system, for example. In one example implementation, the certificate may be self-signed by the REST client 120.

In an example implementation, this new public key/private key pair 153 generated by the REST client 120 and associated with the User ID may not be known to nor used by the user 108. Rather, this new key pair 153 may be generated by the REST client 120 for purposes (for example) of impersonating the user 108 to REST server 130 (or otherwise access REST server 130 on behalf of user 108). As a result, the private key 155 of this new key pair 153 may be stored only by the REST client 120, and may not typically be stored by (or used by) the user 108/computer 110. While the REST client 120 may (as in this illustrative example) have permission to access the user's photos stored on server 130, the generation, storage and use of such new key pair 153 (associated with the User ID) by REST client 120 may be unknown to user 108, for example.

In general, a certificate may provide a way to implement authentication. A user can authenticate itself to a system by presenting his certificate, which binds his public key to his identity (e.g., user ID, name or subject of the certificate). A certification authority, after authenticating the identity of a subject, may digitally sign the certificate using its private key, thereby incorporating its signature into the certificate. In one example, a certificate authority may calculate a digital signature by computing the message digest of the certificate and encrypting it with its private key.

REST client 120 may send a certificate signing request via line 123 to a trusted entity such as certificate authority (CA) 140. Certificate authority 140 is trusted by both the REST client 120 and REST server 130. The certificate signing request may include an unsigned certificate, which may include the user ID for user 108 (or name/subject of the certificate) and the generated public key 154 associated with such user ID. The certificate authority 140 may then sign the certificate using the CA's private key, and return a signed certificate 150 via line 125 to REST client 120. In an example implementation, the signed certificate 150 sent to the REST client 120 may include the certificate (e.g., including the user ID 152 and the public key 154 of the generated key pair 153 that is associated with the User ID for user 108) and the digital signature 156 provided by the certificate authority 140 based on the certificate authority's private key 143. In an example implementation, the certificate may be a X.509 certificate.

At 124, the REST client 120 may impersonate the user 108 to the REST server 130 using the signed certificate 150 (or other credentials) associated with the user ID for user 108 and obtained from the certificate authority 140 to access the resource (e.g., access the user's photos) stored on the REST server 130. In this illustrative example, REST client 120 may be considered to be an authorized impersonator because REST client 120 has permission from user 108 to impersonate user 108 to REST server 130.

In an example implementation, REST client 120 may impersonate user 108 to server 130 by establishing a secure sockets layer (SSL) connection with REST server 130 using the signed certificate 150 and the private key 155 of the generated key pair 153 associated with the user ID of user 108. SSL may also be known as or referred to as Transport Layer Security (TLS). SSL/TLS is a cryptographic protocol that provides communications security over the Internet. SSL/TLS encrypts segments of network connections above the Transport Layer (including HTTP messages), using symmetric cryptography for privacy and a keyed message authentication code for message reliability.

An example implementation of establishing an SSL connection between REST client 120 and REST server 130 will be briefly described. REST client 120 may send a ClientHello message, and REST server 130 may send a ServerHello message where the parties agree on TLS/SSL version number, cipher suites, and other options, for example. The REST server 130 may send its certificate to the REST client 120 via a Certificate message, in the case of mutual authentication. The REST server 130 may request a certificate from the REST client 120 using a CertificateRequest message. The REST client 120 responds with a Certificate message, which contains the REST client's signed certificate 150 (signed by CA 140). The REST client 120 may send a CertificateVerify message, which may be a digital signature over a previous handshake message(s) using the REST client's certificate's private key 155. The REST server 130, using the certificate's public key 154, may confirm that the REST client 120 possesses (or has access to) the private key 155 corresponding to the provided certificate 150, and thus owns the certificate. In this manner, the REST server 130 may authenticate the REST client 120. However, in this case the REST server 130 is authenticating the REST client 120 as the user 108, based on the certificate 150 from CA 140 and the corresponding private key 155, both of which are associated with the user ID of user 108. The REST server 130 and the REST client 120 agree on data encryption keys, where data subsequently transmitted over the SSL connection between REST server 130 and REST client 120 will be encrypted.

Therefore, based on the REST server 130 authenticating the REST client 120 as the user 108, the REST server 130 may then allow the REST client 120 to access the resources assigned to (or owned by) the user 108 (or associated with the user ID of user 108). Thus, for example, the REST client 120 may then access or obtain a copy of the requested resource (e.g., the photo identified by the user 108) that is stored at REST server 130 via a stateless protocol between the REST client 120 and the REST server 130. Thus, in one example implementation, REST client 120 may obtain the requested resource on REST server 130 via HyperText Transfer Protocol Secure (HTTPS), in which the HTTP methods or HTTP messages are encrypted over the SSL connection that was previously established between the REST client 120 and REST server 130. Thus, for example, a HTTP Get message (e.g., including a link, URL or other identifier that identifies the requested resource or photo), encrypted via the previously established SSL connection, is sent from the REST client 120 to the REST server 130. The REST server 130 replies with the requested resource, e.g., the requested photo.

In one example implementation the resource obtained by the REST client 120 from REST server 130 may be forwarded to the user computer 110. In another example implementation, the REST client 120 may process the requested resource and then forward or provide the processed resource to the user 108 or user computer 110, e.g., as requested. For example, REST client 120 (e.g., as part of a photograph print service) obtains a requested photo from REST server 130 by obtaining security credentials associated with the user ID for user 108 from CA 140 and then using these security credentials (e.g., certificate 150 and corresponding private key 155 associated with the user ID for user 108) to impersonate the user 108 to REST server 130 to access or obtain the identified resource, as described above. In this manner, REST client 120 may obtain the requested resource (e.g., the identified photo) without further input or intervention by the user, despite the limitations of the stateless protocol (or RESTful protocol), such as HTTPS. REST client 120 may then process the requested resource by, in this photo example, printing a color print copy of the identified and retrieved photo, and then mailing or delivering the requested print to user 108, for example.

Figure 2:
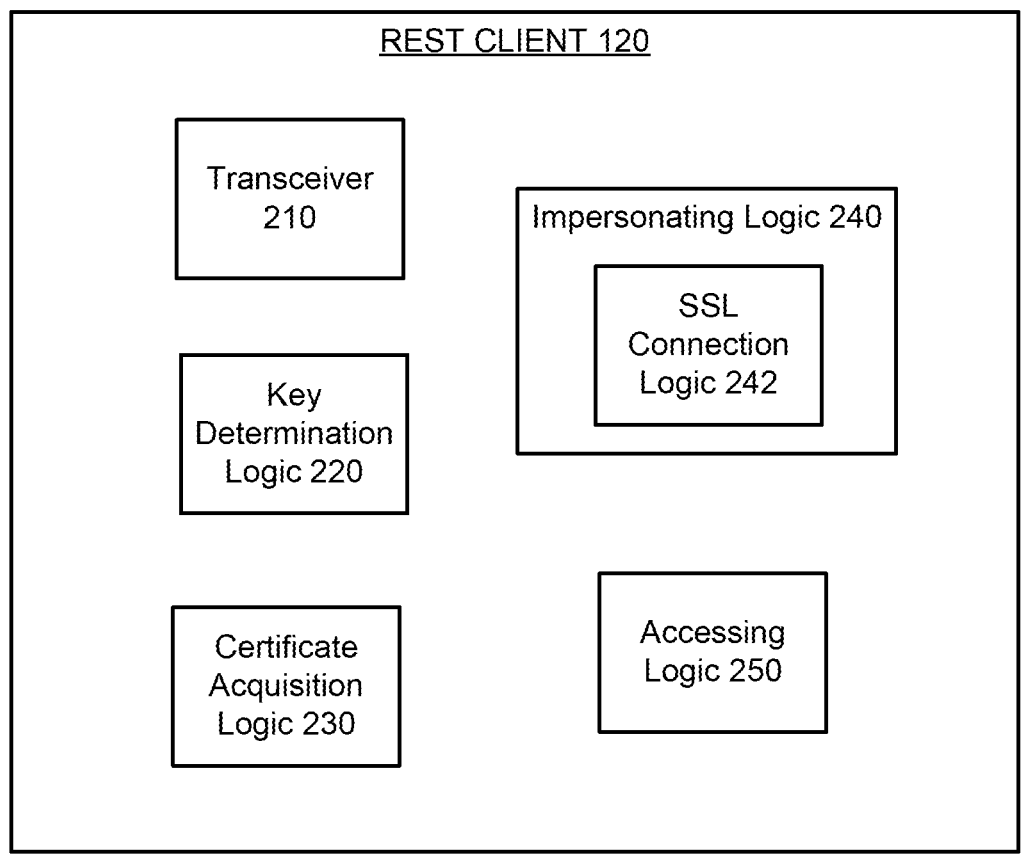
FIG. 2 is a block diagram illustrating a REST client according to an example implementation.

FIG. 2 is a block diagram illustrating a REST client according to an example implementation. A transceiver 210 is configured to receive a resource request at a representational state transfer (REST) client from a user. The resource request may include a user ID, for example. Key determination logic 220 may be configured to determine, by the REST client, a key pair 153 including a public key 154 and a corresponding private key 155 that are associated with the user ID. Certificate acquisition (or obtaining) logic 230 may be configured to obtain (or acquire), by the REST client 120, a certificate 150 associated with the user ID that is signed by a certificate authority 140 and based on at least the user ID and the public key 154 associated with the user ID. Impersonating (or impersonation) logic 240 may be configured to impersonate, by the REST client 120, the user 108 to a REST server 130 using the certificate 150 and the private key 155 associated with the user ID. Also, accessing logic 250 may be configured to access, by the REST client on behalf of the user, using a stateless protocol with the REST server 130, the requested resource.

In one example implementation, the impersonating logic 240 may include SSL connection logic 242 configured to establish by the REST client 120, a secure sockets layer (SSL) connection with a REST server 130 using the certificate 150 and the private key 155 associated with the user ID.

Also, in one example implementation, the key determination logic 220 may be configured to generate, by the REST client 120, a key pair 153, including a public key 154 and a corresponding private key 155 that are associated with the user ID. This key pair may be unknown to the user, and the private key 155 for the key pair may be stored by the REST client 120 and not stored by the user computer 110. This key pair 153 may be used by the REST client 120 to impersonate the user 108 in communicating with the REST server 130 to access the requested resource. In one example implementation, the certificate may be a X.509 certificate that includes the user ID, the public key 154 associated with the user ID and a digital signature 156 provided by the certificate authority 140 based on the certificate authority's private key 143.

Figure 3:
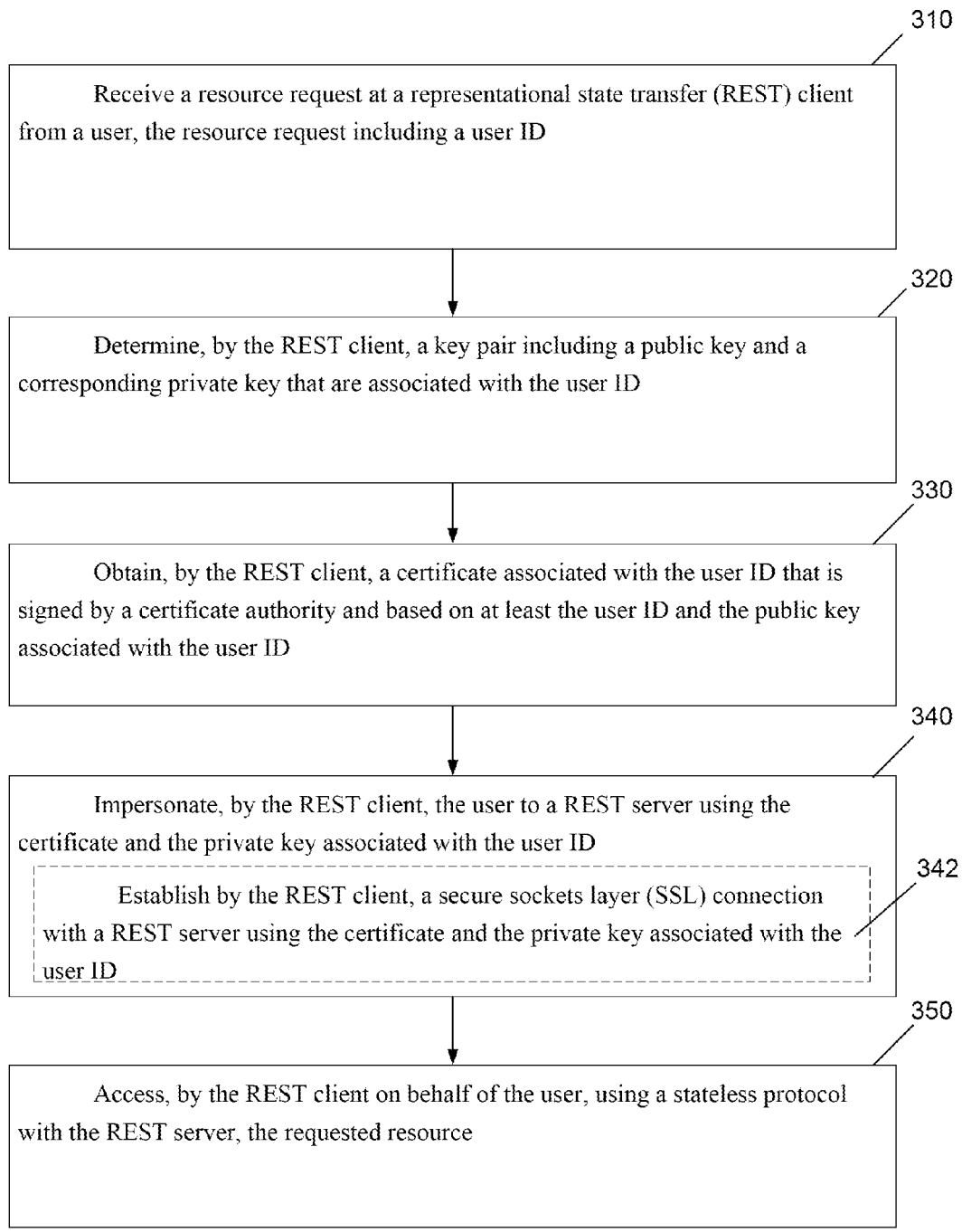
FIG. 3 is a flow chart illustrating operation of a REST client according to an example implementation.

FIG. 3 is a flow chart illustrating operation of a REST client 120 according to an example implementation. A resource request is received at a representational state transfer (REST) client 120 from a user (310). The resource request may include a user identifier (user ID). The REST client 120 determines a key pair 153 that includes a public key 154 and a corresponding private key 155 that are associated with the user ID (320). The REST client 120 obtains a certificate 150 associated with the user ID that is signed by a certificate authority 140 and based on at least the user ID and the public key 154 associated with the user ID (330). The REST client 120 impersonates the user 108 to a REST server 130 using the certificate 150 and the private key 155 associated with the user ID (340). The REST client 120 accesses, on behalf of the user, using a stateless protocol with the REST server 130, the requested resource (350).

In one example implementation, the impersonating operation (340) may include establishing, by the REST client 120, the user to a REST server 130 using the certificate 150 and the private key 155 associated with the user ID (342).

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program that might implement the techniques mentioned above might be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-readable storage device including executable code that, when executed, is configured to cause at least one data processing apparatus to:
   receive, by an intermediate representational state transfer (REST) client and from a separate user computer, a request for a resource stored on a REST server, the resource request including a user ID associated with a user;
   determine, by the intermediate REST client and responsive to the resource request, that a key pair associated with the user ID is not stored on the intermediate REST client;
   based on determining that a keypair associated with the user ID is not stored on the intermediate REST client;
   generate, by the intermediate REST client, a public key and a corresponding private key, the generated public key and the corresponding generated private key included in a keypair associated with the user ID; and
   store the generated keypair on the intermediate REST client in association with the user ID;
   obtain, by the intermediate REST client, a certificate associated with the user ID that is signed by a certificate authority and based on at least the user ID and the generated public key associated with the user ID;
   establish a connection between the intermediate REST client and the REST server using the certificate and the generated private key associated with the user ID; and
   access, by the intermediate REST client on behalf of the user of the user computer, using a stateless protocol with the REST server, the requested resource.

2. The computer-readable storage device of claim 1 wherein the executable code causing the data processing apparatus to establish comprises executable code causing the data processing apparatus to establish by the intermediate REST client, a secure sockets layer (SSL) connection with the REST server using the certificate and the generated private key associated with the user ID.

3. The computer-readable storage device of claim 1 wherein the executable code causing the data processing apparatus to obtain comprises executable code causing the data processing apparatus to:
   send a certificate signing request from the intermediate REST client to the certificate authority, the certificate signing request including an unsigned certificate; and
   receive, at the intermediate REST client from the certificate authority, the certificate that has been signed by the certificate authority.

4. The computer-readable storage device of claim 3 wherein the unsigned certificate includes the user ID and the generated public key associated with the user, and wherein the signed certificate received by the intermediate REST client from the certificate authority includes the certificate and a digital signature provided by the certificate authority based on a private key associated with the certificate authority.

5. The computer-readable storage device of claim 1 wherein the executable code further causes the data processing apparatus to authenticate, by the intermediate REST client, the user.

6. The computer-readable storage device of claim 1 wherein the executable code further causes the data processing apparatus to forward, by the intermediate REST client, the requested resource obtained from or via the REST server to the user computer.

7. The computer-readable storage device of claim 1 wherein the generated key pair, including the generated public key and the corresponding generated private key, is unknown to the user and the user computer, and is used by the intermediate REST client to impersonate the user, with permission from the user, in communicating with the REST server to access the requested resource, wherein the requested resource is stored by or controlled by the REST server and assigned to or associated with the user.

8. The computer-readable storage device of claim 1 wherein the executable code causing the data processing apparatus to determine comprises executable code causing the data processing apparatus to:
   determine, by the intermediate REST client and responsive to the resource request, that a key pair associated with the user ID is stored on the intermediate REST client; and
   based on determining that a keypair associated with the user ID is stored on the intermediate REST client, retrieve from memory included in the intermediate REST client, a key pair previously generated and stored in the memory, the generated key pair including a generated public key and a corresponding generated private key that are associated with the user ID, the retrieving of the generated keypair allowing the intermediate REST client to impersonate the user to the REST server.

9. The computer-readable storage device of claim 1 wherein the certificate comprises a X.509 certificate that includes the user ID, the generated public key associated with the user ID and a digital signature provided by the certificate authority based on the certificate authority's private key.

10. The computer-readable storage device of claim 1 wherein the certificate authority is an entity that is separate from the intermediate REST client.

11. The computer-readable storage device of claim 1 wherein the stateless protocol comprises hypertext transfer protocol secure (HTTPS).

12. The computer-readable storage device of claim 1 wherein the intermediate REST client comprises a SSL-enabled client that implements hypertext transfer protocol secure (HTTPS) as a stateless protocol to communicate with the REST server.

13. The computer-readable storage device of claim 1 wherein the executable code further causes the data processing apparatus to:
  obtain, by the intermediate REST client, the requested resource from the REST server; and
  perform, by the intermediate REST client, an action using the requested resource, the action identified by and received from the separate user computer.

14. A computer implemented method comprising:
  receiving a resource request at an intermediate representational state transfer (REST) client from a separate user computer, a request for a resource stored on a REST server, the resource request including a user ID associated with a user;
  determining, by the intermediate REST client and responsive to the resource request, that a key pair associated with the user ID is not stored on the intermediate REST client;
  based on determining that a keypair associated with the user ID is not stored on the intermediate REST client:
    generating, by the intermediate REST client, a public key and a corresponding private key, the generated public key and the corresponding generated private key included in a keypair associated with the user ID; and
    store the generated keypair on the intermediate REST client in association with the user ID;
  obtaining, by the intermediate REST client, a certificate associated with the user ID that is signed by a certificate authority and based on at least the user ID and the generated public key associated with the user ID;
  establishing a connection between the intermediate REST client and the REST server using the certificate and the generated private key associated with the user ID; and
  accessing, by the intermediate REST client on behalf of the user of the user computer, using a stateless protocol with the REST server, the requested resource.

15. The computer implemented method of claim 14 wherein the establishing comprises establishing by the intermediate REST client, a secure sockets layer (SSL) connection with the REST server using the certificate and the generated private key associated with the user ID.

16. The computer implemented method of claim 14 and further comprising forwarding, by the intermediate REST client, the requested resource obtained from or via the REST server to the user computer.

17. The computer implemented method of claim 14 wherein the generated key pair, including the generated public key and the corresponding generated private key, is unknown to the user and the user computer, and is used by the intermediate REST client to impersonate the user in communicating with the REST server to access the requested resource, and wherein the certificate comprises a X.509 certificate that includes the user ID, the generated public key associated with the user ID and a digital signature provided by the certificate authority based on the certificate authority's private key.

18. An apparatus comprising:
  a transceiver configured to receive at an intermediate representational state transfer (REST) client and from a separate user computer, a request for a resource stored on a REST server, the resource request including a user ID associated with a user;
  key determination logic configured to:
    determine, by the intermediate REST client and responsive to the resource request, that a key pair associated with the user ID is not stored on the intermediate REST client, and based on determining by the key determination logic that a keypair associated with the user ID is not stored on the intermediate REST client:
    generate, by the intermediate REST client, a public key and a corresponding private key, the generated public key and the corresponding generated private key included in a keypair associated with the user ID; and
    store the generated keypair on the intermediate REST client in association with the user ID;
  certificate acquisition logic configured to obtain, by the intermediate REST client, a certificate associated with the user ID that is signed by a certificate authority and based on at least the user ID and the generated public key associated with the user ID;
  impersonating logic configured to establish a connection between the intermediate REST client and the REST server using the certificate and the generated private key associated with the user ID; and
  accessing logic configured to access, by the intermediate REST client on behalf of the user, using a stateless protocol with the REST server, the requested resource.

19. The apparatus of claim 18 wherein the impersonating logic comprises SSL connection logic configured to establish by the intermediate REST client, a secure sockets layer (SSL) connection with a REST server using the certificate and the generated private key associated with the user ID.

20. The apparatus of claim 18 wherein the key pair, including the generated public key and the corresponding generated private key is unknown to the user and the user computer, and is used by the REST client to impersonate the user in communicating with the REST server to access the requested resource, and wherein the certificate comprises a X.509 certificate that includes the user ID, the generated public key associated with the user ID and a digital signature provided by the certificate authority based on the certificate authority's private key.

\* \* \* \* \*